United States Patent [19]

Jarrell et al.

[11] 4,215,347
[45] Jul. 29, 1980

[54] TARGET SEEKER SIMULATOR

[75] Inventors: Edward C. Jarrell, Damascus; Donald R. Marlow, Highland; Howard B. Tetens, Rockville; Joseph F. Gulick, Clarksville, all of Md.

[73] Assignee: The United States of America as represented by the Secretary of the Navy, Washington, D.C.

[21] Appl. No.: 960,991

[22] Filed: Nov. 15, 1978

[51] Int. Cl.² .............................................. G01S 3/22
[52] U.S. Cl. ................................. 343/117 R; 35/10.4; 343/16 M
[58] Field of Search ..................... 343/16 M, 117 R; 35/10.4

[56] References Cited

U.S. PATENT DOCUMENTS

| | | | |
|---|---|---|---|
| 2,964,266 | 12/1960 | Fuchs | 343/117 R X |
| 3,084,340 | 4/1963 | Stout et al. | 343/117 R X |
| 3,141,164 | 7/1964 | Holcomb et al. | 343/16 M |
| 3,175,215 | 3/1965 | Blasberg et al. | 343/16 M |
| 3,680,102 | 7/1972 | Poinsard | 343/16 M |
| 3,977,000 | 8/1976 | Wagner | 343/16 M |
| 4,065,771 | 12/1977 | Gulick et al. | 343/117 R X |

*Primary Examiner*—T. H. Tubbesing
*Attorney, Agent, or Firm*—R. S. Sciascia; A. L. Branning

[57] ABSTRACT

An incoming enemy missile is simulated by pointing the radiation transmitting antenna of a drone missile, regardless of the actual movement of the drone, at the launch site of a friendly intercept missile or other friendly object without changing direction of flight.

6 Claims, 4 Drawing Figures

TARGET SEEKER SIMULATOR

BACKGROUND OF THE INVENTION

Direction finding systems and homing aircraft are well known in the prior art. In U.S. Pat. No. 3,886,555 a direction finding system is disclosed wherein a target which radiates an electromagnetic or sound wave is followed by an antenna which provides azimuth and elevation outputs. Similarly, U.S. Pat. No. 3,164,831 teaches a directive receiving system which reorients the direction of an antenna toward a fixed signal source. Likewise, U.S. Pat. No. 2,446,024 discloses a system which remains oriented toward the direction of propagation of received waves; the reception of waves reflected off a remote aircraft or launch site is used in conjunction with a scanning means to direct an antenna toward the signal source. In like fashion U.S. Pat. No. 3,042,917 provides a method and arrangement for positioning a directive signal receiving apparatus to follow signals generated at a remote moving source. Although finding the direction of a signal radiating source, none of the above-discussed references generate a signal from the reoriented antenna back toward an object at or near the signal source. Ground controlling an antenna on a drone missile, such that the antenna can transmit a signal which simulates an enemy transmission is nowhere mentioned or suggested. U.S. Pat. No. 2,950,474 discloses a missile guidance system having antenna elements arranged in pairs in an array. Radiation reflected off an object is received by the elements and examined in amplitude and phase, a signal being produced which indicates the orientation of the antenna with respect to the object. The antenna is switched between transmit and receive modes and can be rotated so that its axis of directivity points toward the object or target. The apparatus in the reference, however, is directed to a control apparatus which reorients the direction of the missile, not just the antenna, toward the object or target. The discussed prior art references, although relating to the object of directing an antenna toward a remote object, do not provide the apparatus required for simulating an enemy missile in flight.

U.S. Pat. No. 2,950,474 deserves special comment. Although provided with transmit-receive switching as is the present invention, it is intended by the system disclosed in the reference that transmission precede reception and that the received signal be a return based on the transmitted signal. This is a reverse of the operation of the present invention wherein a ground controlled signal is first received by the antenna to redirect it and then a transmission signal is generated having characteristics like those of enemy transmissions. Further, in accordance with this prior art reference, the missile changes its direction of flight in accordance with the changing axis of directivity of the antenna attached thereto. The invention, on the other hand, provides that the simulated enemy missile continue in its flight and that only the antenna carried by the missile be reoriented.

SUMMARY OF THE INVENTION

From the above discussion, it can be seen that an object of the invention is to simulate an enemy missile in flight by reorienting an antenna carried by a drone missile such that its transmission, which simulates enemy signals, is directed toward a friendly object.

It is another object of the present invention to employ a signal diplexer which permits the reception by the antenna of a ground-controlled CW signal which is used to redirect the orientation of the antenna carried by the missile for simultaneous transmission of radiation from the missile toward a friendly object, such as a ship or launch site. The diplexer is a passive device utilizing a waveguide bandpass filter to separate the two signals.

It is a further object of the invention to provide a missile having an antenna which orients itself toward a specific object on the earth without redirecting the flight of the missile.

It is still another object of the invention to provide essentially concurrent reception and transmission where the transmit mode frequency bandwidth is sufficiently distinct from the receive mode bandwidth.

It is still a further object of the present invention to provide apparatus which simulates an enemy target seeker. In particular, an array antenna receives signals from a ground station located where the target is. Performing sums and differences on the signals of the array elements, elevation and azimuth signals are generated which are used to orient the antenna toward the ground controlled signal source. In accordance with the invention, servos provide inputs only to the antenna and not to the flight control elements of the missile.

DESCRIPTION OF THE PREFERRED EMBODIMENT

Figure 1:
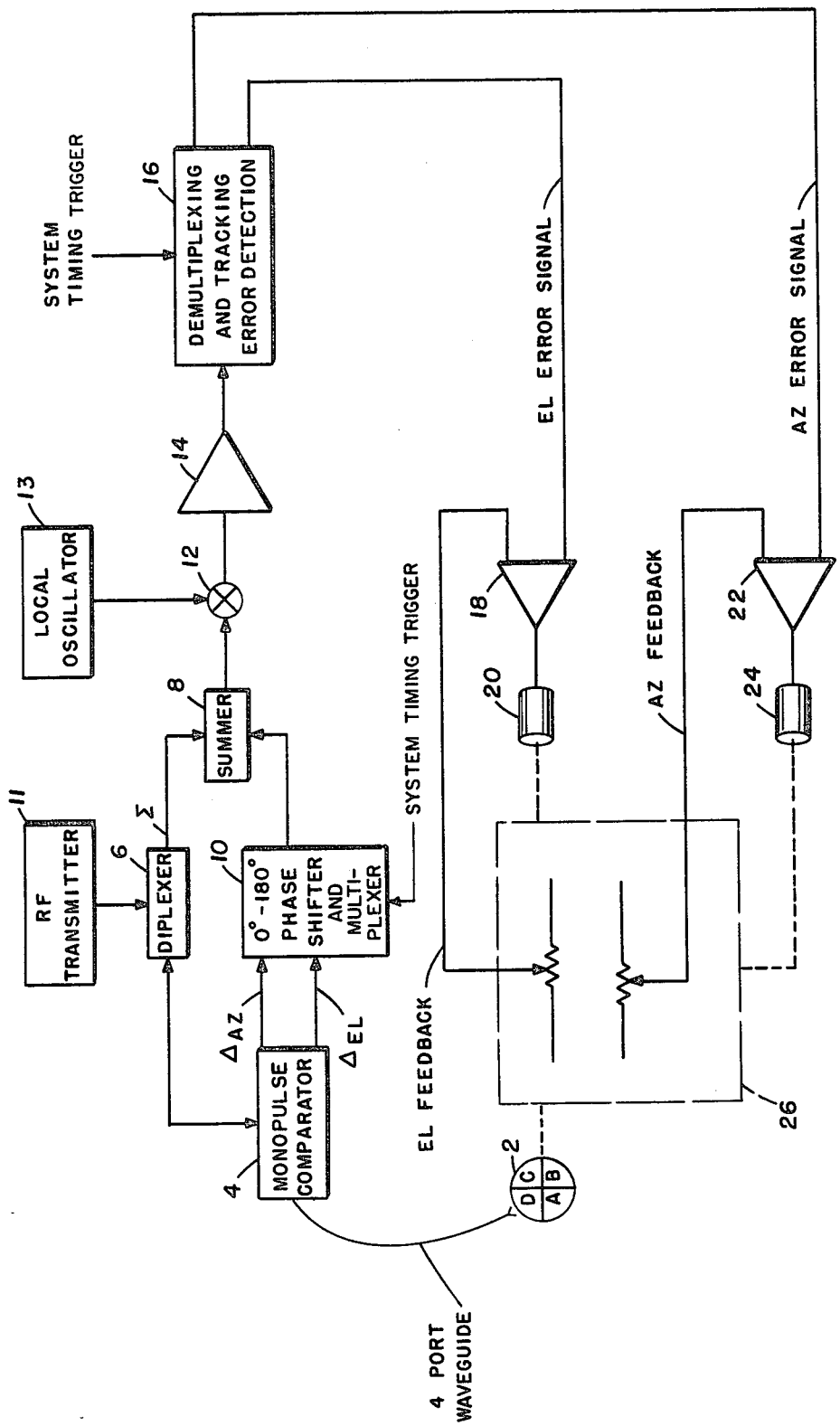
FIG. 1 shows a block diagram of the present invention.

Referring to FIG. 1, a receive and transmit system is shown. In reception, a signal from a ground-based beacon signal source 1 (see FIG. 4) transmits a signal to a four-port monopulse antenna 2 carried by a drone missile 3 (shown in FIG. 4). A four-port waveguide passes the received signals to a monopulse comparator 4 which generates a sum $\Sigma$ signal and difference signals corresponding to azimuth and elevation $\Delta_{AZ}$ and $\Delta_{EL}$ respectively. Examining the array pattern of antenna 2, elements A, B, C, D (which receive signal a, b, c, d respectively) are shown positioned in counter clockwise fashion beginning in the lower left portion of the antenna 2. The sum signal $\Sigma$ generated by the monopulse comparator 4 is equal to $a+d+b+c$; difference signal $\Delta_{AZ}$ is represented by $(a+b)$ minus $(c+d)$; and difference signals $\Delta_{EL}$ is represented by $(a+b)$ minus $(c+d)$. In more prosaic terms, the three signals $\Sigma$, $\Delta_{AZ}$ and $\Delta EL$ might be termed the "beacon signal present" signal, azimuth error signal, and elevation error signal, respectively. The azimuth and elevation error signals $\Delta_{AZ}$ and $\Delta_{EL}$ are RF signals having envelopes proportional to the angle the axis of directivity of the antenna is offset from the line to the ground-controlled beacon signal source 1. Still in the receive mode, the sum signal $\Sigma$ passes through a diplexer 6 which channels the $\Sigma$ signal to a summer 8.

An RF transmitter 11 and ground-based signal source 1 are of such different frequencies to permit the present system to transmit and receive simultaneously through the diplexer 6.

Simultaneously, the $\Delta_{AZ}$ and $\Delta_{EL}$ signals are entered into a phase shifter and multiplexer 10 which is timed off a system timing trigger synchronized with an RF transmitter 11. The $\Delta_{AZ}$ and $\Delta_{EL}$ signals are combined into a single channel by the phase shifter and multiplexer 10. That is, the phase-shifter and multiplexer 10 passes $\Delta_{EL}$ for two trigger periods and $\Delta_{AZ}$ for the next two trigger periods. At the same time, the $\Delta_{EL}$ or $\Delta_{AZ}$ signal (whichever is passing at a given time) is subjected to a phase shift which alternates between 0° and 180° on each successive trigger. This phase shifting and multiplexing effect by element 10 is suggested by lines 3 and 4 of FIG. 2. The output from the phase shifter and multiplexer 10 is then a 180° phase-shifted $\Delta_{EL}$ signal followed by an unshifted $\Delta_{EL}$ signal followed by a 180° phase-shifted $\Delta_{AZ}$ signal followed by an unshifted $\Delta_{AZ}$ signal. The output from the phase shifter and multiplexer 10 is then impressed onto the sum signal $\Sigma$ in summer 8. The output of summer 8 is a signal which is amplitude modulated alternately by the azimuth $\Delta_{AZ}$ and elevation $\Delta_{EL}$ error signals, respectively. The degree of modulation is a measure of the deviation of the target from the axis of directivity, or boresight.

The amplitude modulation of the sum $\Sigma$ signal exits the summer 8 (of FIG. 1) and enters a mixer 12 together with the output of a local oscillator 13. The output of mixer 12 is an IF frequency which is passed through an IF amplifier 14. The IF amplifier 14 is used to normalize the angle information by means of automatic gain control (AGC). The AGC function of IF amplifier 14 is to keep the short-time average video level constant in the presence of both very large slow changes and large moderately fast changes in the IF input signal. To filter off multiplexing harmonics, the AGC filtering was chosen as second order. The output from the IF amplifier 14 enters a demultiplexer 16 which takes the amplitude modulation (multiplexed +AZ, −EL, +EL, −AZ) signal after mixing and restores the elevation error signal and azimuth error signal, after normalization, as positive or negative d.c. levels. This can be seen from FIGS. 2 and 3 which illustrate the demultiplexing of the single channel signal. Demultiplexer and tracking error detection element 16 is shown in FIG. 3. The circuitry in FIG. 3 provides sequential pulsing from dividers 100 and 102 on lines $l_0$ through $l_3$ (as illustrated in lines 5 through 8 of FIG. 2).

Figure 2:
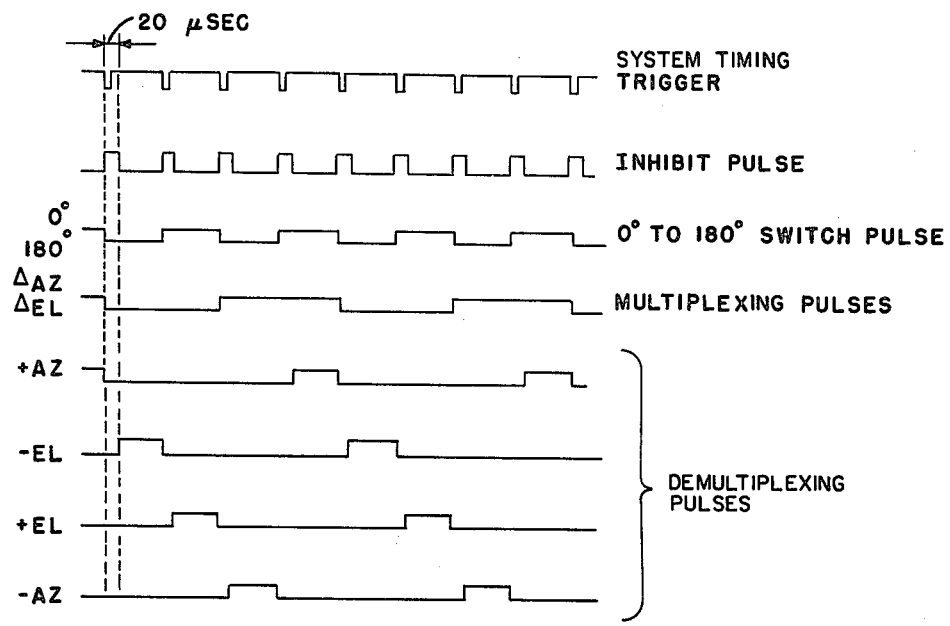
FIG. 2 shows a timing diagram.
Figure 3:
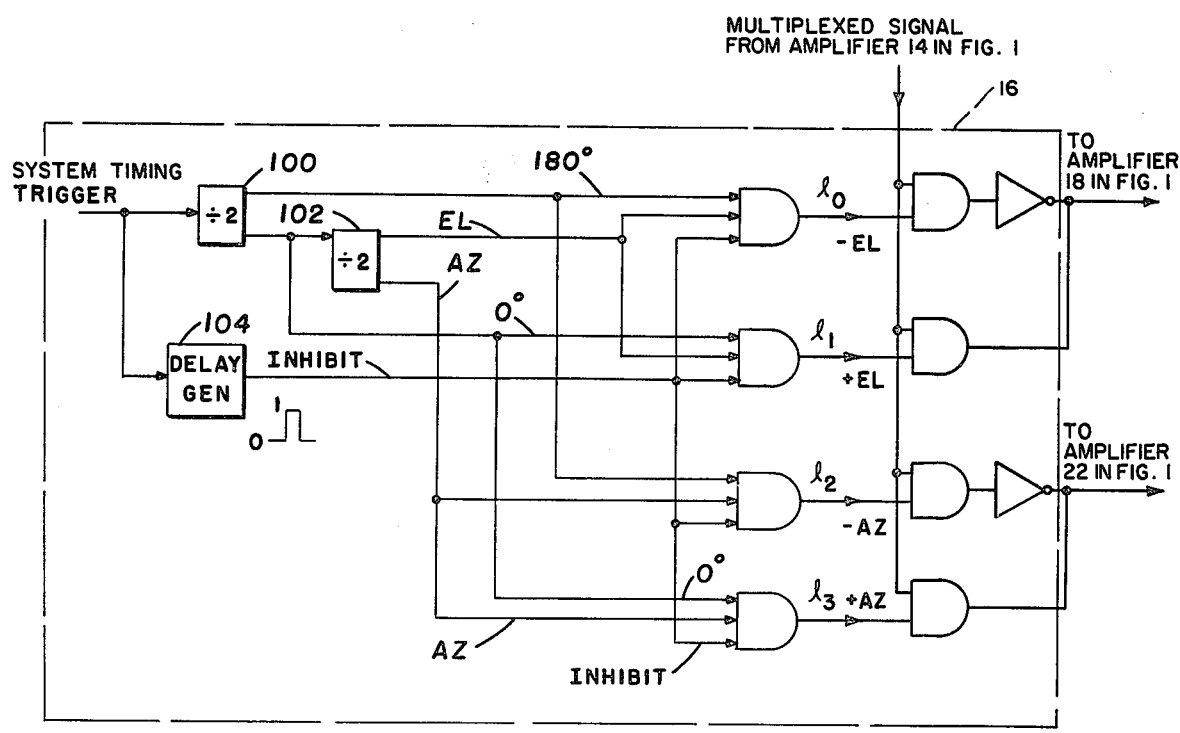
FIG. 3 shows circuitry for the drone carried portion of the invention which selectively gates azimuth and elevation signals.

Referring to FIG. 2, it can be seen that the demultiplexed pulses are coordinated with the multiplexing taking place in phase shifter and multiplexer 10. Labelling a 180° phase shifted signal as negative, i.e., $-\Delta_{EL}$ or $-\Delta_{AZ}$, the output signal sequence from the phase shifter and multiplexer 10, previously discussed, is $-\Delta_{EL}$, $+\Delta_{EL}$, $-\Delta_{AZ}$, $+\Delta_{AZ}$. Logically combining lines 2, 3, and 4 of FIG. 2, gate pulses are shown generated in the sequence −EL, +EL, −AZ, +AZ. An inhibit pulse (in line 2 of FIG. 2) is provided by delay generator 104 to prevent large magnitude transmission pulses from being mistakenly processed as error signals. The gate pulses −EL, +EL, −AZ, +AZ of the demultiplexer and tracking error detection element 16 are synchronized with the $-\Delta_{EL}$, $+\Delta_{EL}$, $-\Delta_{AZ}$, and $+\Delta_{AZ}$ signals, respectively, by means of the system timing trigger which is applied to elements 10 and 16. Conventional gating and inverters are included in the demultiplexer and tracking error detection element 16 to produce the desired positive and negative d.c. elevation and azimuth error signals.

Referring again to FIG. 1, the demultiplexed elevation error signal enters an elevation servo amplifier 18 which is connected to a corresponding servo motor 20. The servo motor 20 causes the antenna to vary its orientation about the elevation axis in response to the elevation error signal, +EL or −EL, input. A feedback signal enters servo amplifier 18 as is known in the art. Similarly a closed loop is also provided for azimuth adjustments of the antenna. The azimuth loop comprises an azimuth servo amplifier 22, an azimuth servo motor 24, and a feedback line emanating from a position potentiometer 26. Azimuth error signals, +AZ and −AZ, provide inputs to the azimuth servo amplifier 22.

Figure 4:
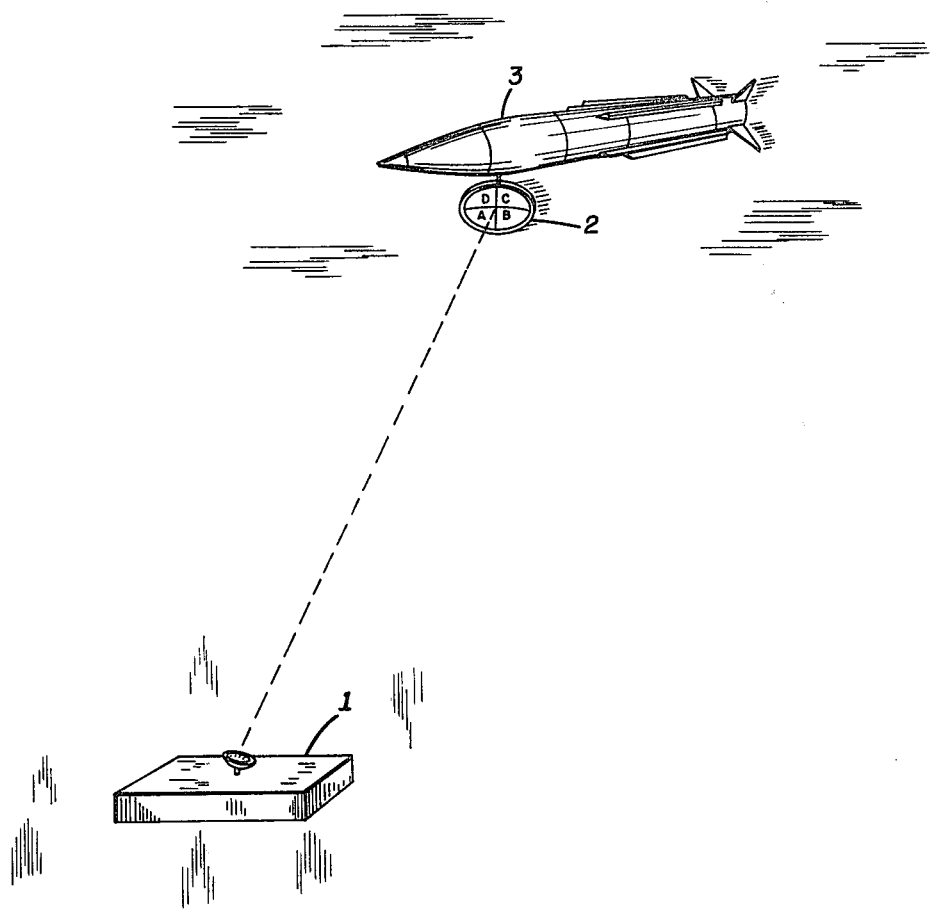
FIG. 4 is an illustration generally showing elements of the present invention.

As the antenna is being reoriented in response to the signal received from the ground controlled beacon signal source 1, the RF transmitter 11 is generating a signal which simulates that of an enemy missile homing in on a friendly object, such as a launch site or intercept missile. This is shown in FIG. 4. Referring to FIG. 2, the RF transmitter signal is generated when the reception is blanked out during the inhibit pulse. Because receiver operation is timed to occur during periods when the RF transmitter 11 is not triggering, the two functions can coexist without affecting each other adversely.

Various other modifications, adaptations and alterations are of course possible in light of the above teachings. Therefore, it should be understood at this time that within the scope of the appended claims the invention may be practiced otherwise than as specifically described.

What is claimed is:

1. A target seeker simulator system comprised of:
a drone missile having means for transmitting an output signal, and
means for directing the output signal of the transmitting means at the target while the drone missile is in flight, wherein the output signal directing means comprises:
  means, located proximate to the target, for generating a beacon signal aimed at the drone missile,
  means, provided on the drone missile, for receiving the beacon signal,
  an antenna comprising the transmitting means and beacon signal receiving means, and
  means for reorienting the antenna in response to the received beacon signal, and
diplexer means for simultaneously transmitting the output signal and receiving the beacon signal.

2. A target seeker simulator system as in claim 1, wherein the antenna further comprises:
an antenna array having an axis of directivity, said antenna array being comprised of elements all of which receive the beacon signal and transmit the output signal, and
wherein the target seeker simulator system further comprises:
means for combining the signals received at the elements to produce azimuth and elevation difference signals, which reflect the different signals received by the elements when the axis of directivity is noncoincident with the direction toward the beacon signal generating means indicating a tracking error.

3. A target seeker simulator system, as in claim 2, wherein the means for reorienting the antenna further comprises:

means, connected to the antenna array, for repositioning the axis of directivity of the antenna array to align with the beacon signal direction.

4. A target seeker simulator system, as in claim 3, further comprising:
   means, connected to the output of the signal combining means, for multiplexing the azimuth and elevation difference signals onto a single channel,
   means for normalizing the multiplexed azimuth and elevation difference signals, and
   means for demultiplexing the signals outputted from the normalizing means and detecting the tracking error based on the difference signals, thereby recovering normalized azimuth and elevation error signals which are provided to the antenna array repositioning means as inputs.

5. A target seeker simulator system, as in claim 4, wherein normalizing means comprises amplifier means for automatic gain control.

6. A target seeker simulator system as in claim 4, further comprising:
   means for time correlating the operation of the multiplexing means and the demultiplexing means.

* * * * *

UNITED STATES PATENT AND TRADEMARK OFFICE
CERTIFICATE OF CORRECTION

PATENT NO. : 4,215,347
DATED : July 29, 1980
INVENTOR(S) : Jarrell et al

It is certified that error appears in the above-identified patent and that said Letters Patent are hereby corrected as shown below:

column 2, line 55, change "(a+b) minus (c+d)" to -- (a+d) minus (b+c) --.

column 2, line 57, change "$\Delta EL$" to -- $\Delta_{EL}$ --.

Signed and Sealed this

Tenth Day of March 1981

[SEAL]

*Attest:*

RENE D. TEGTMEYER

*Attesting Officer*  *Acting Commissioner of Patents and Trademarks*